(12) United States Patent
Werbin

(10) Patent No.: US 7,658,100 B2
(45) Date of Patent: Feb. 9, 2010

(54) DEVICE AND METHOD FOR MEASURING AIR MOVEMENT

(76) Inventor: Roy Geoffrey Werbin, 57 Adams Cir., Apt. C, Fairfield, OH (US) 45014

( * ) Notice: Subject to any disclaimer, the term of this patent is extended or adjusted under 35 U.S.C. 154(b) by 0 days.

(21) Appl. No.: 11/724,393

(22) Filed: Mar. 15, 2007

(65) Prior Publication Data

US 2007/0214879 A1 Sep. 20, 2007

Related U.S. Application Data

(60) Provisional application No. 60/783,184, filed on Mar. 16, 2006.

(51) Int. Cl.
*G01W 1/00* (2006.01)
(52) U.S. Cl. .................................. 73/170.01
(58) Field of Classification Search .............. 73/170.01, 73/170.16
See application file for complete search history.

(56) References Cited

U.S. PATENT DOCUMENTS

| | | | |
|---|---|---|---|
| 5,315,909 A | | 5/1994 | Hsu |
| 5,334,797 A | | 8/1994 | Niedge |
| 5,616,861 A | * | 4/1997 | Hagen .......................... 73/180 |
| 5,744,736 A | | 4/1998 | Chang |
| 5,942,691 A | * | 8/1999 | Hopkins et al. ................ 73/706 |
| 6,124,782 A | | 9/2000 | Kraft, Sr. |
| 6,504,471 B1 | | 1/2003 | Lam |
| 6,525,248 B2 | | 2/2003 | Chatkeonopadol |
| 6,559,367 B1 | | 5/2003 | Yiu |
| 6,585,662 B1 | * | 7/2003 | Jones et al. .................. 600/538 |
| 6,604,691 B1 | | 8/2003 | Thomas |
| 6,640,742 B1 | | 11/2003 | Grupp |
| 6,668,640 B1 | * | 12/2003 | Alwin et al. .............. 73/170.02 |
| 2003/0047059 A1 | | 3/2003 | Brown |
| 2003/0071069 A1 | * | 4/2003 | Shelton ....................... 222/190 |

OTHER PUBLICATIONS

U.S. Appl. No. 10/236,236, filed Sep. 6, 2002, Brown.
Disc Doc 550014, Mar. 29, 2004, Roy Geoffrey Werbin.
U.S. Appl. No. 60/783,184, Mar. 16, 2006, Roy Geoffrey Werbin.
Omni Instruments, "MMW Wind Sensor Connections", http://www.omniinstruments.co.uk/airweath/MMW005connections.pdf, last accessed Jun. 7, 2007.
Omni Instruments, "Mierij Meteo MMW005 Weather Station", http://www.omniinstruments.co.uk/airweath/mmweather.htm, last accessed Jun. 7, 2007.

(Continued)

*Primary Examiner*—Andre J Allen
(74) *Attorney, Agent, or Firm*—Geoffrey M. Losekamp, Esq.

(57) ABSTRACT

This device has a detection means to measure the relative amount of air movement in its vicinity. The detection means is coupled to a processing means for creating a variable trigger signal that is proportional to detected air movement. The detection means consists of a differential pressure transducer mounted inside a specially-shaped enclosure. The pressure transducer is arranged to measure the air pressure difference between two holes in the enclosure. The shape of the enclosure causes air to flow at different velocities near the holes, creating a differential air pressure. The processing means consists of a microprocessor that periodically samples the signal from the differential pressure transducer. A programmed algorithm calculates a variable trigger signal value based on a plurality of sampled signals. The processing means can also incorporate an algorithm for digitally generating audio signals that have attributes based on the value of the trigger signal.

23 Claims, 5 Drawing Sheets

OTHER PUBLICATIONS

Omni Instruments, "MMW Wind Sensor Connections", http://www.omniinstruments.co.uk/airweath/MMW005connections.pdf, last accessed Jun. 7, 2007.

Omni Instruments, "Air Flow / Environmental", http://www.omniinstruments.co.uk/airweath/airweath.html, last accessed Jun. 7, 2007.

Omni Instruments, "Wind Sonic Wind Speed and Direction Sensor", http://www.omniinstruments.co.uk/airweath/WindSonicWebDatasheet.pdf, last accessed Jun. 7, 2007.

Omni Instruments, "Vaisala Weather Transmitter WXT510", http://www.omniinstruments.co.uk/airweath/Vailsala%20Weather%20Transmitter%20WXT510.pdf, last accessed Jun. 7, 2007.

Omni Instruments, "Vaisala WINDCAP® Ultrasonic Wind Sensor WMT50", http://wwwomniinstruments.co.uk/airweath/Wind%20sensor%20WMT50.pdf, last accessed Jun. 7, 2007.

Tsi Ab, "EBT 720 Series Electronic Balancing Tools", http://www.alnorinstruments.eu/downloads/brochures/EBT4Pg2980260Secure.pdf, last accessed Feb. 14, 2009.

* cited by examiner

DEVICE AND METHOD FOR MEASURING AIR MOVEMENT

CROSS-REFERENCE TO RELATED APPLICATIONS

This application claims the benefit of provisional patent Ser. No. 60/783,184, filed Mar. 16, 2006 by the present inventor.

Other filings: Disclosure Document No. 550014, Mar. 29, 2004

COMPUTER PROGRAM LISTING

This application includes a computer program listing appendix submitted on compact disc. The total number of compact discs submitted is 2. The two discs are identical with the following content:

Copy 1: windchime.asm, Jan. 14, 2006, 41,179 bytes

Copy 2: windchime.asm, Jan. 14, 2006, 41,179 bytes

BACKGROUND OF THE INVENTION

1. Field of the Invention

This invention generally relates to wind chimes, specifically to an improved device employing solid-state electronics for the detection of air movement and programmed electronic generation of sounds.

2. Description of Related Art

Many improvements and modifications have been made to the traditional wind chime. Many design patents have been issued for unique wind chime designs. Also several utility patents have been issued for alternative methods of detecting wind or generating sounds.

Various devices have been disclosed that have a power means to drive mechanical chimes in the absence of wind. U.S. Pat. No. 6,559,367 uses a magnetic arrangement to provide movement of a striking device towards chime rods. U.S. Pat. No. 5,744,736 has an electric powered pendulum that strikes chime rods in a preset sequence. It also has an auxiliary pendulum to strike the rods in the presence of natural wind. U.S. Pat. No. 6,640,742 has a motor-driven element that strikes mechanical chime tubes in a desired sequence. It also uses tubes with different diameters to save space. U.S. Pat. No. 6,525,248 also describes a space saving design using a rod with a folding joint. It is driven by natural wind. The current invention improves on these devices by not requiring any powered mechanical means.

Several devices have been disclosed that use electrical contacts that are moved together by wind to trigger a chime generating circuit or other device. U.S. Pat. No. 6,124,782 consists of a sound-generating circuit that is triggered by a wind switch having multiple contacts. In U.S. Pat. No. 5,315,909, music generation is triggered by a wind control switch using a circular conductor, and a conductive rod. U.S. Pat. No. 6,504,471 describes a transducer apparatus to trigger a chime or other device in response to air movement and acceleration, consisting of multiple contacts. The current invention detects airflow directly and does not require exposed electrical contacts.

Two other disclosures describe methods of striking chimes using unique mechanical arrangements. U.S. Pat. No. 5,334,797 uses a propeller which drives hammers for striking chime tubes in a predetermined sequence. U.S. patent application Ser. No. 10/236,236 describes a specific mechanical arrangement using a baffle and a tether for striking chime rods in response to wind. The current invention improves on these devices by not requiring any moving parts.

U.S. Pat. No. 6,604,691 describes a support for a wind driven device, but does not contain a specific wind detection design.

A meteorological instrument company in The Netherlands, Mierij Meteo, produces a solid state wind speed and direction sensor, model MMW05. The sensor uses a ceramic material that is maintained at a constant temperature. Wind causes small temperature changes that can be measured with thermocouples on various points on the ceramic. This information is used to derive very accurate wind speed and direction information. While this device provides accurate measurements, the present invention provides an inexpensive means of approximating wind speed.

BRIEF SUMMARY OF THE INVENTION

In accordance with the illustrative embodiments demonstrating features and advantages of the present invention there is provided a device for measuring wind intensity and generating sounds consistent with the wind intensity. The device consists of a wind-detection means and a processing means.

The wind detection means includes a differential pressure transducer and a specially-shaped enclosure. The pressure transducer can provide a pressure-difference signal indicating the difference in pressure at its two ports. The specially-shaped enclosure provides different-length paths for the airflow past two holes provided in the enclosure. Airflow is forced to travel faster along the path with the greater length. The pressure transducer ports are coupled to the two holes such that the difference in pressure, due to the difference in wind speed, can be measured.

The processing means samples the pressure-difference signal and stores a plurality of signal values. The signal values are used to calculate a variable trigger signal that represents the relative wind intensity. The processing means can use the variable trigger signal to generate chimes or other sounds with properties that are dependent on wind speed. The processing means can also be programmed to perform other tasks or control other devices.

A principle objective of this invention is to provide a wind chime that is more versatile and robust than a traditional wind chime, employing solid state electronics for detection of air movement.

Another objective of this invention is to provide a wind chime that responds only to air movement and not to movement of the device itself, allowing the device to be attached to a fixed surface in any orientation or used in a moving vehicle, while minimizing unwanted chimes and potential damage.

Another objective of this invention is to provide programmed chime generation that can be customized to provide a variety of sounds with adjustable sensitivity to wind activity.

These and other objectives and advantages of the present invention will become apparent upon consideration of the ensuing detailed description and drawings.

DETAILED DESCRIPTION OF THE INVENTION

Figure 1:
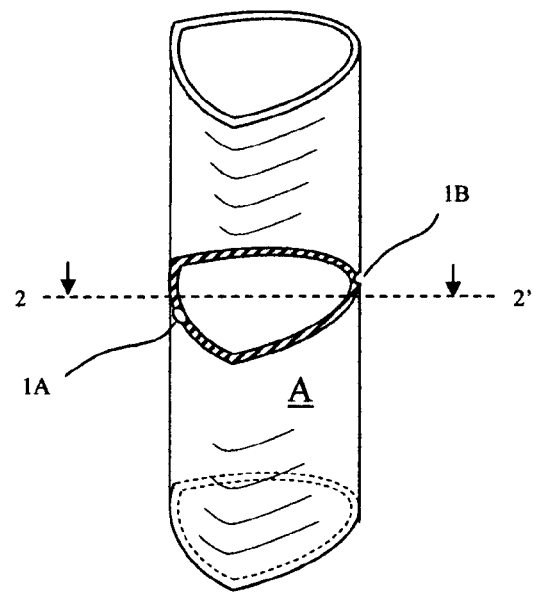
FIG. 1 is a perspective view of an example enclosure used for the preferred embodiment.

An enclosure in accordance with the preferred embodiment of the present invention is shown in FIG. 1. The enclosure is made from a tube with a specialized cross-sectional shape. Custom tubing made from plastic or other materials can be obtained with arbitrary cross-sections from several suppliers. The cross section shown is roughly shaped like the letter "D" with rounded edges. Alternate embodiments may use tubing with other cross-sectional shapes including but not limited to circular, oval, triangular or rectangular. Other embodiments may be completely contained in a spherical or egg-shaped enclosure. Two small holes, 1A and 1B are made in opposite sides of the tube surface, A. These holes provide air pressure sample locations for the differential pressure transducer. One side is curved outward slightly presenting a large radius near hole 1A. The other side is elongated, creating a smaller radius near hole 1B. The modified shape enhances the difference in pressure at the two holes. Alternatively, appendages can be added to a circular tube to modify the outer surface shape. The tube may be left open at one or both ends. The tube can be approximately 10 cm. long and 2.5 cm. in diameter to accommodate the pressure transducer, battery and other circuitry.

Figure 2:
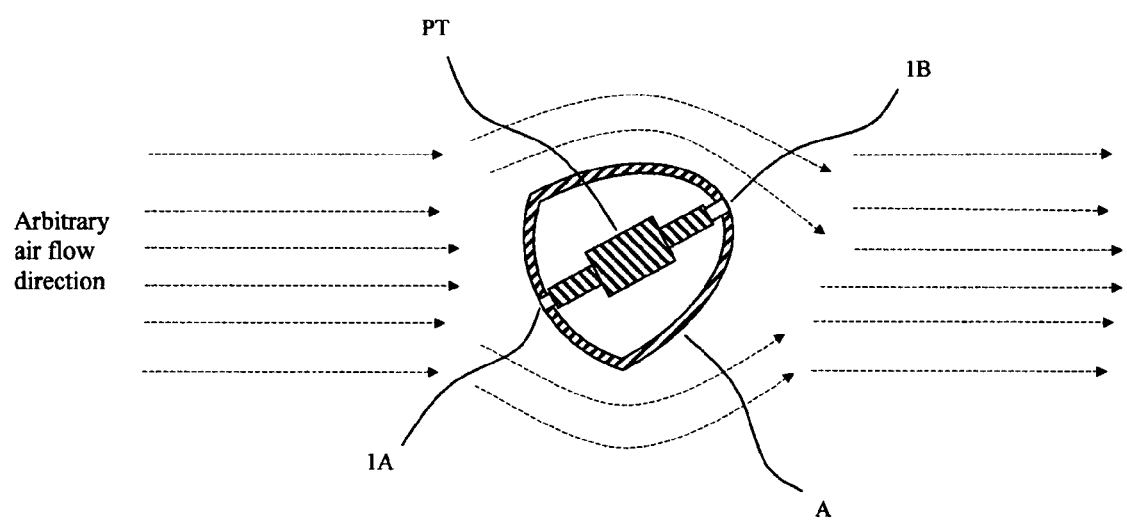
FIG. 2 is a cross-sectional view taken along line 2-2' of FIG. 1 showing the differential pressure transducer mounted in the enclosure.

As shown in FIG. 2, the holes interface with the two ports of differential pressure transducer, PT. The PT can be mounted on a circuit board inside the tube with other circuitry. The ports may be modified or extended as needed to provide an air-tight seal with the holes. For most directions of air flow, there will be a longer path across hole 1B compared to the path across hole 1A. Since the path lengths of the airflow are different, the air velocities will be different. The different velocities will cause a pressure difference between the two sample locations. This effect is due to the Bernoulli Principle of Fluids, which states that the pressure of a compressible fluid is related to its velocity. Another cause of pressure differences at the two holes is random turbulence of the airflow as it passes by the tube at various angles. If air flow is facing directly toward one of the holes, the pressure will generally be higher at the facing port. In addition, the surface may employ a texture to increase the amount of laminar air flow across the surface. The effect is similar to that of dimples used on golf balls. A laminar air flow would reduce the effect of turbulence, giving a pressure difference related more to air velocity. The present invention uses these pressure differences to generate a variable trigger signal that is proportional to the relative intensity of airflow.

Figure 3:
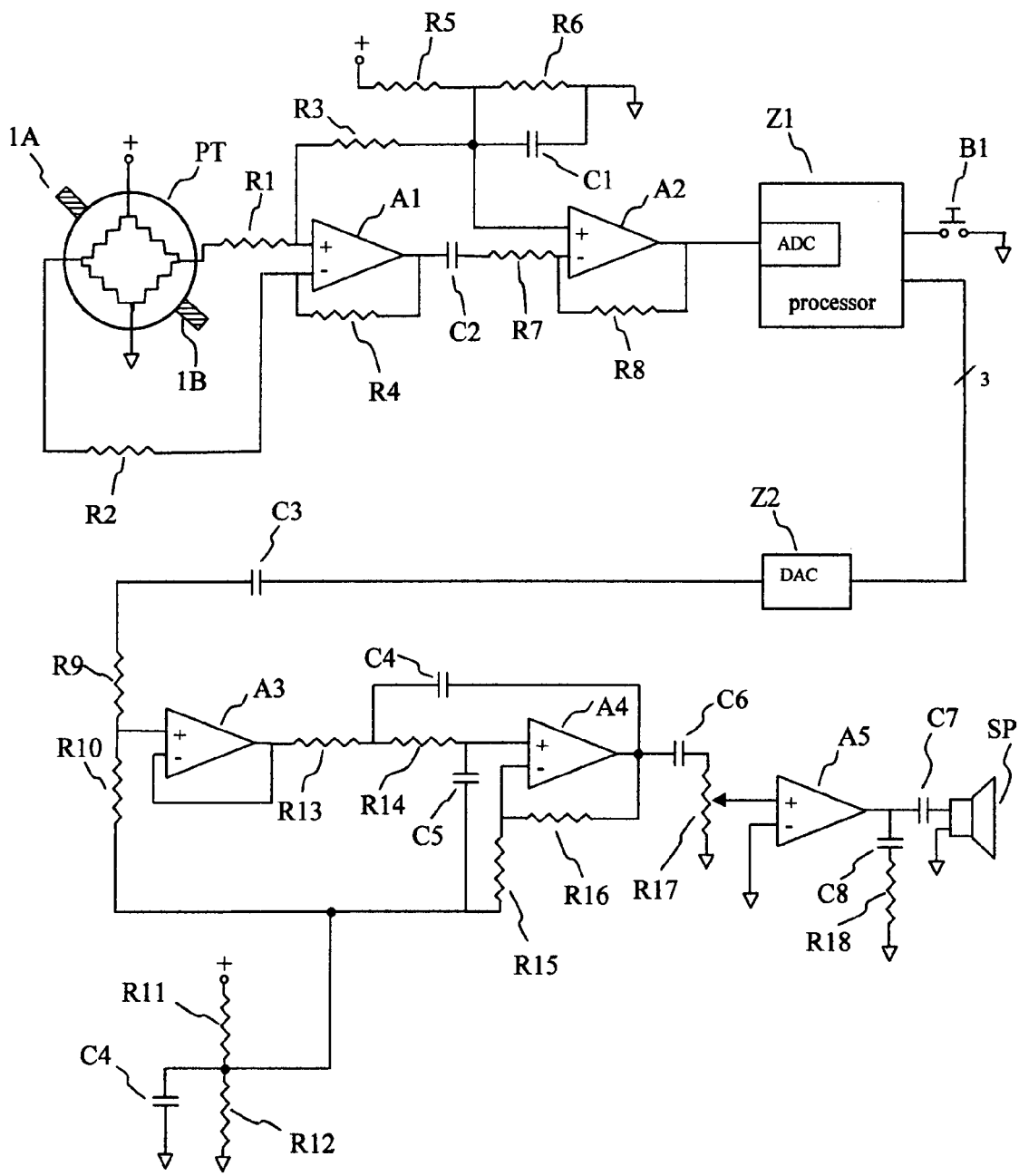
FIG. 3 is a schematic diagram of an electrical circuit in accordance with the principles of the present invention.

The following discussion refers to the schematic diagram shown in FIG. 3. The differential pressure transducer (PT), such as a Honeywell 24PCAFA6D, is normally biased by a supply voltage on one pin and a corresponding ground connection on another pin. A pressure signal voltage appears across the other two pins that is related the difference in pressure between Port 1A and Port 1B. The transducer is manufactured such that pressure differences in either direction can be measured. The pressure signal is fed in a differential manner through resistors R1 and R2 to an amplifier, A1. This is a common operational amplifier providing large gain and low bandwidth, such as one quarter of a National LM324 quad op amp. Two resistors R3 and R4 complete a high gain amplifier to increase the amplitude of the pressure signal. The pressure signal is AC-coupled through capacitor C2 to the next stage. The amplifier A2, which may be another quarter of the LM324, along with resistors R7 and R8 provide more amplification of the pressure signal to obtain the desired sensitivity to pressure changes. Resistors R5 and R6 and capacitor C1 create a voltage reference at approximately one half of the supply voltage, so that the output of A2 will be centered between 0 volts and the supply voltage. The resulting signal is fed to an Analog-to-Digital Converter ADC, which is incorporated in the processor, Z1. The processor may be a low power, 8-bit device with a built in ADC unit, such as the Microchip PIC16F873. The processor can be programmed to sample the ADC input voltage corresponding to the magnitude of the pressure signal.

In the disclosed embodiment, the processor Z1 also generates data values at regular time intervals that correspond to audio waveform samples. Three signal lines are used to send the data values to a Digital-to-Analog Converter (DAC), Z2. This is an integrated circuit such as the Maxim MAX550A. The data interface conforms to the commonly used SPI format by Motorola, Inc. One signal selects the DAC as the data recipient. Another signal provides a clock signal to synchronize the data. Another signal is used for the actual data.

Z2 will create output voltages that correspond to the provided data. When supplied with appropriate data at regular intervals, the DAC can create analog waveforms in the audible frequency range. The output voltage values must be output at a rate at least twice that of the highest audio frequency to be produced. In accordance with the Nyquist Theorem, this assures that unwanted frequency components can be filtered out.

The voltage output from Z2 is fed through capacitor C3 to remove any DC offset voltages that are present. Resistors R9 and R10 create a voltage divider to reduce the signal level. The signal is fed through a unity gain amplifier, A3. This can be the third quarter of the LM324 device. This amplifier does not increase signal amplitude, but it isolates the DAC from the following stage to maintain signal characteristics.

Amplifier A4, the fourth quarter of the LM324 device, provides an active low-pass filter in the Sallen-Key configuration. The components R13, R14, C4 and C5 are chosen to create a resistors R11, R12 and capacitor C4 provide a one-half supply voltage reference for the filter circuit. The resulting signal is a low-level audio waveform. Another amplification stage, A5, is used to give the signal sufficient energy to drive a speaker so the sound can be heard at a distance. A common single chip amplifier device such as the National LM386, provides enough power to drive a small speaker. The output of the low-pass filter is fed through C6 to remove any DC offsets. A variable resistor, R17 is configured as a volume control that provides a constant load for the filter stage. The wiper of R17 selects an input voltage to the final audio amplifier, A5. The LM386 device is configured as a constant gain amplifier to minimize external component requirements. Capacitor C8 and resistor R18 provide necessary filter components recommended by the LM386 manufacturer. Capacitor C7 couples the amplified audio signal to a speaker, SP. The speaker SP is mounted inside the enclosure near an open end.

A button, B1 is connected to an input of the processor, Z1 to provide for user control of the device. Various modes of operating this and/or additional buttons are provided to select on and off states, as well as various sound options.

The circuit is powered by a battery that is carried inside the enclosure. The circuit is designed to maximize the life of the battery, for example by removing power from certain components when they are not needed. The device may have an automatic shut-off feature to limit the operation periods. If used outdoors, a solar panel integrated onto the enclosure can help extend the battery life.

The processor, Z1 contains a computer program to control several functions. The exact implementation may vary, however the required software functions are described in the flow charts of FIGS. 4, 5 and 6. A computer program implemented with the principles of the present invention is listed in the appendix of this specification. Other implementations of a computer program could be used.

Figure 4:
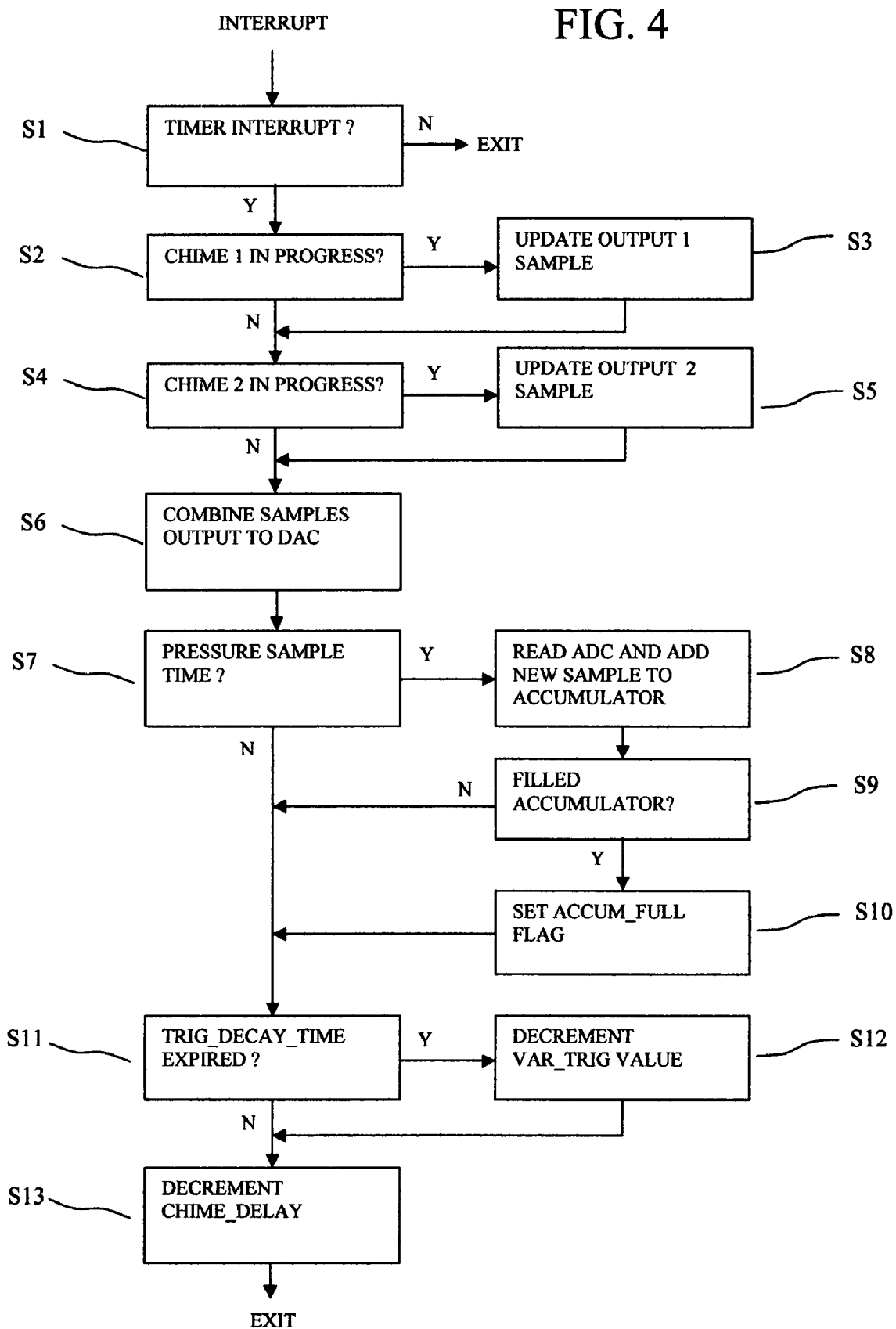
FIGS. 4, 5 and 6 are flowcharts illustrating the programming associated with the device and implemented with the principles of the present invention.

FIG. 4 is the flow chart of a routine that is entered by various interrupt triggers of Z1. This routine takes priority over other operations the processor may be handling at the time. One interrupt trigger of Z1 occurs at regular intervals based on an internal hardware timer. The timer interval is based on an external crystal and programmed parameters. The crystal frequency and parameter values can be chosen to cause the routine to be accessed approximately 10,000 times per second. The measurement of the pressure signal and calculation of output samples are based on this rate. The sample values for creating audio waveforms must be output at reliable intervals, interval is based on an external crystal and programmed parameters. The crystal frequency and parameter values can be chosen to cause the routine to be accessed approximately 10,000 times per second. The measurement of the pressure signal and calculation of output samples are based on this rate. The sample values for creating audio waveforms must be output at reliable intervals, however the period for sampling the pressure signal may be adjusted to modify the performance of the air movement detection.

In step S1, the processor determines if the routine has been accessed due to the timer expiration or one of other possible interrupt reasons. If the timer has expired, it is reset for the next timeout and step S2 is accessed. If not, the routine is exited.

In step S2, the processor checks a software flag to determine if Chime #1 is currently in progress. Since each chime sound may last up to 3 seconds, there are approximately 30,000 samples to be output while the chime is in progress. If the chime is in progress, step S3 is accessed. Otherwise, step S4 is accessed.

Step S3 determines the next sample value for Chime #1. The routine used is described in association with FIG. 5. Whether or not step S3 was accessed, control continues to step S4.

Step S4 is similar to step S2. The processor checks the status of Chime #2 and if active, step S5 is accessed. Otherwise, step S6 is accessed.

Step S5 determines the next sample value for Chime #2. Steps S3 and S5 both use the routine of FIG. 5, except for operating on a different set of variables. Additional chimes may be generated in the same way. Whether or not step S5 was accessed, control continues to step S6.

In step S6, all of the active samples are combined using a signed summation to mix the chime sounds. The resulting sample value is sent over the SPI interface to the DAC as described in association with FIG. 3. After step S6, control continues to step S7.

Step S7 keeps a count of how many times the timer interrupt routine has been called. This effectively divides the time base by a desired value. A typical divide value is 256, so that the counter completes each 0.0256 seconds. The counter value must be reset in this step if the count is completed. This less frequent event is used to trigger the internal analog to digital converter (ADC) to read a new pressure signal value. When the divide count is complete, step S8 is accessed. If not, control continues to step S11.

In step S8, the latest value from the ADC is read. In the preferred processor, this is a 10-bit binary value between 0 and 1023, inclusive. To improve consistency of the results, a plurality of sample values are added to a 16-bit accumulator register. When a constant number of samples have been summed, the total will be divided by the number of samples to provide an average. Alternatively, a continuous average can be obtained by adding the new value and subtracting the oldest value before dividing by the number of samples. This step always continues to step S9.

In step S9, the number of samples added to the accumulator is compared to a predetermined number. The number chosen determines the length of the accumulated average. In the disclosed embodiment a value of 16 is used, although different length averages can be used. If the predetermined number of samples have been accumulated, the processor proceeds to step S10, otherwise control proceeds to step S11.

In step S10, the ACCUM_FULL flag bit is set. This flag signals the routine of FIG. 6 that the accumulator is full and ready for examination. After this step, control proceeds to step S11.

Step S11 is accessed during each timer interrupt, whether or not chime samples or pressure samples were processed. In the disclosed embodiment, this will occur approximately each 0.0256 seconds. A counter, TRIG_DECAY_TIME, is decremented to divide this time to a slower interval. This is a non-critical timer since the period will depend on what processing was done during the interrupt. This counter may use a value between 2 and 5, to cause an event to occur a few times per second. If the counter decrements to zero, it is reset to the starting value and step S12 is accessed. Otherwise control proceeds to step S13.

In step S12, the value of the VAR_TRIG signal is decremented by one. The VAR_TRIG signal represents the current amount of wind activity. The VAR_TRIG signal will decay to zero if no new, higher value is set in step S30 of FIG. 6. This allows the VAR_TRIG signal to track increases in the pressure measurements, but lag behind them as they decrease. The amount of lag can be adjusted by the selecting the value of TRIG_DECAY_TIME used in step S11. After this step, control is transferred to step S13.

In step S13, another non-critical timer, CHIME_DELAY is maintained. The timer value is decremented each time until zero is reached. CHIME_DELAY can be set to an arbitrary value in other parts of the program. When the value reaches zero, various events can be triggered.

Figure 5:
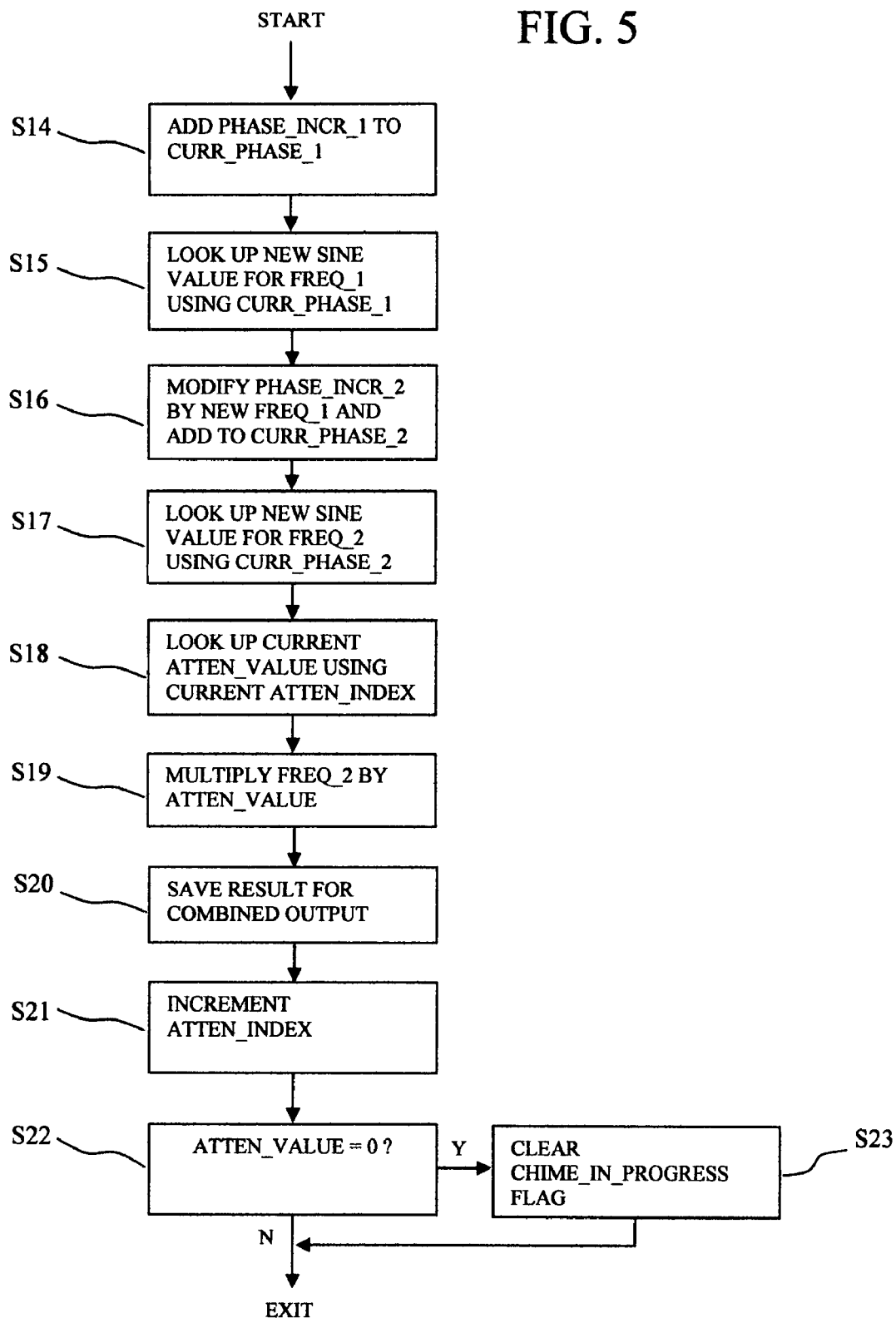

FIG. 5 is a flow chart describing the process of creating one output sample value. The process is valid for each waveform that will be generated. It is initiated in steps S3 and S5 of FIG. 4. The disclosed embodiment generates chime sounds based on the value of the VAR_TRIG signal. Alternate embodiments could use the VAR_TRIG signal for other purposes. The chime sound is approximated with a Double-Sideband Suppressed-Carrier (DSB-SC) waveform. The waveform can be created by multiplying together two sinusoidal (sine) waves, or by modulating the frequency of one sine wave with another. The disclosed embodiment implements the later method using a digital algorithm to create the DSB-SC waveform. The result contains a mix of frequencies that has the metallic sound of a ringing chime. Since the algorithm is under programmed control, it allows easy modification and adjustment of the sound parameters.

Each chime is specified by two PHASE_INC values, which determine the frequencies of the two sine waves used. To create a sine wave, the PHASE_INC value is added to the current phase, CURR_PHASE, at regular intervals. The new CURR_PHASE value is used as the offset into a table. The table contains amplitude values for one full cycle of a sine wave. Each table entry represents the amplitude at a particular phase step. If a 16-bit value is maintained for the CURR_PHASE, the complete 360 degree sinusoidal wave is separated into 65,536 different phase values (i.e. approximately 0.0055 degrees per CURR_PHASE value). When CURR_PHASE goes beyond the maximum number of steps, it is wrapped around to the beginning of the table to begin the next cycle of the waveform. Since the sinusoidal wave is symmetrical, the table can be reduced to one quarter of a cycle if proper inversions are made depending on the current phase quadrant.

The frequency of a sine wave can be modulated by using a varying phase step. The software uses a constant PHASE_INC to create one sine wave. The scaled amplitude of this wave is used to modify the constant PHASE_INC of the second wave. The second wave is therefore frequency modulated by the first wave.

The modulated waveform is then amplitude limited by an exponentially decaying envelope to simulate the natural attenuation of a mechanical chime after it is struck. A table of scaling factors is used with an incrementing index, ATTEN_INDEX. This index can start at zero, or at a later point in the table. This way, the initial loudness and the duration of the chime can be adjusted. The decaying envelope can also encode some low-frequency amplitude modulation that is common in chimes. Multiple decay envelope tables may used to vary the chime sounds.

In step S14, the phase increment value PHASE_INCR_1 is added to the current phase for sine wave #1, CURR_PHASE_1. The value is wrapped around to the beginning of the table if needed.

In step S15, the new phase value is used as the index to the sine table. The value obtained from the table is saved as the next sample of sine wave #1, FREQ_1.

In step S16, the constant phase increment value, PHASE_INCR_2, is modified by the new sample value for FREQ_1, obtained in step S15. The value of FREQ_1 is first scaled to a smaller, proportional value which may be positive or negative. When it is added to the constant PHASE_INCR_2 value, the value is slightly increased or decreased. The modified PHASE_INCR_2 is then added to the current phase value for sine wave #2, CURR_PHASE_2. This will effectively modulate the frequency of sine wave #2.

In step S17, the new CURR_PHASE_2 is used as the index to the sine table. The value obtained from the table is the resulting frequency modulated sample for FREQ_2.

In step S18, the current ATTEN_INDEX is used to look up the scaling factor, ATTEN_VALUE for the current sample. ATTEN_VALUE will be used to reduce the amplitude of the current sample of the modulated waveform.

In step S19, the current value of FREQ_2 is multiplied by ATTEN_VALUE.

In step S20, the result of step S19 is saved. It will be combined with any other chimes in progress in step S6 of FIG. 4.

In step S21, ATTEN_INDEX is incremented by one.

In step S22, the ATTEN_VALUE is checked for a value of zero, meaning that the amplitude of the waveform has faded to zero. This occurs at the end of the table. If the value is zero, control proceeds to step S23. Otherwise, the routine exits.

In step S23, the CHIME_IN_PROGRESS flag is cleared, indicating that the current chime has completed. After this step, the routine exits.

Figure 6:
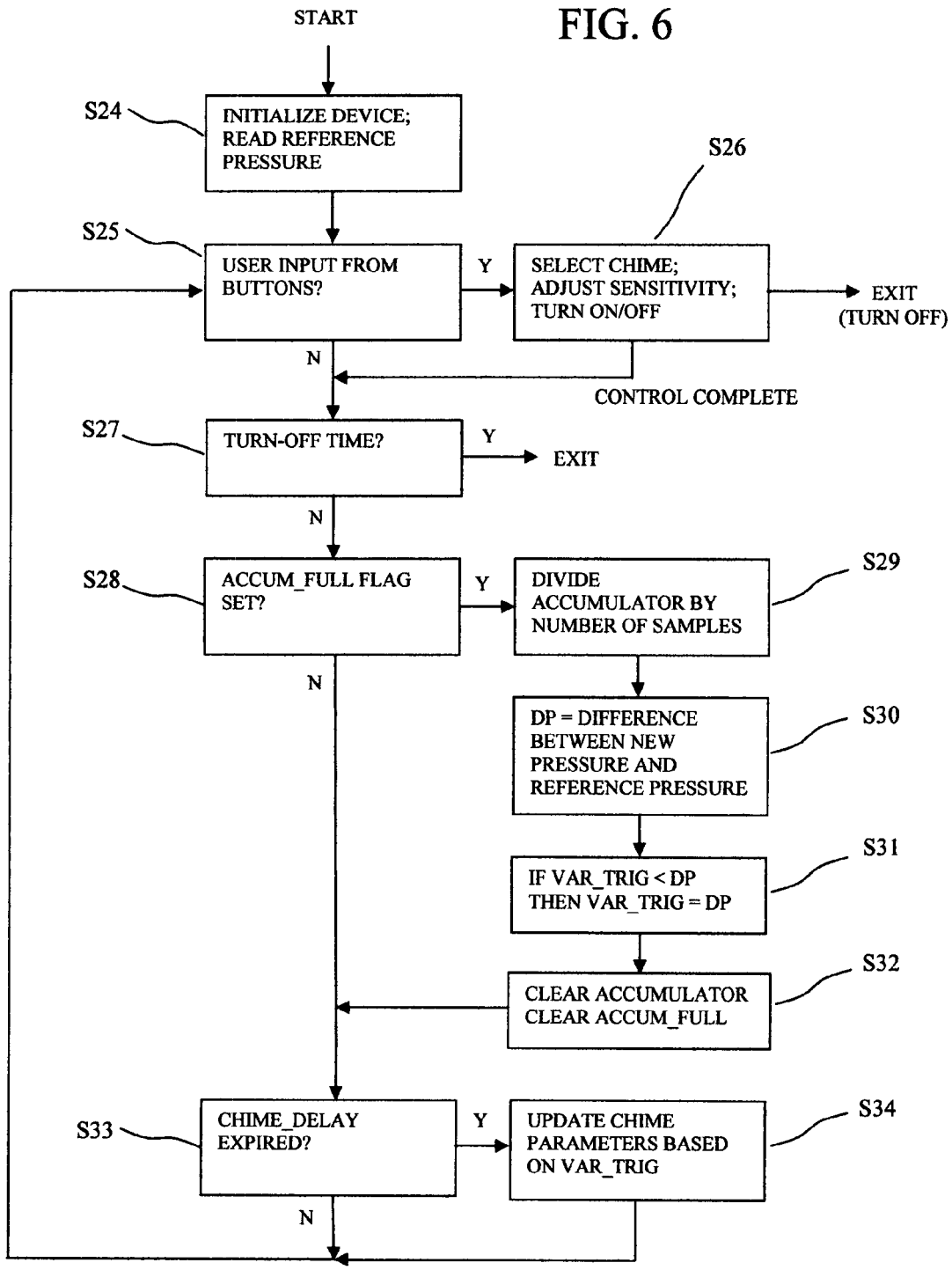

The main routine of the software is described by the flowchart in FIG. 6. This routine is entered when the device is turned on. This routine runs continuously unless it is interrupted by a higher-priority task.

In step S24, the processor is initialized for operation including enabling various interrupts and setting initial memory values. The processor then reads a plurality of pressure samples, and calculates a reference value. This value will be used for comparing future samples. Ideally, this reference value represents the nominal pressure signal, when there is no air movement. Slow changes in the nominal pressure signal may occur due to component variations, temperature, barometric pressure, humidity, etc. Therefore, the preferred embodiment occasionally performs a recalibration by adjusting the reference value to match the long-term average pressure signal. This way, new pressure signals will accurately represent short-term changes in air flow.

In step S25, a state machine determines if various user controls are activated. One or more buttons may be used to control device features. The state machine may determine the duration and number of button presses to expand the control functions. For example, a short press (less than one second) may select a different set of chime sounds, and a long press may turn the device on or off. If a control action is required, control is transferred to step S26. If no control action is indicated by button presses, control is transferred to step S27.

In step S26, the appropriate control action is executed. If a new chime set is selected, the phase increment values for the chime set can be read from a table and stored for current use. A sensitivity value may be adjusted to set the amount of chime activity desired. If the user selects to turn off the device, this routine is exited and the device is turned off. After any other control action is completed, control is transferred to step S27.

In step S27, a turn-off timer is checked. This timer is started when the device is turned on, and reset when a control action is executed. If the device is left on for the pre-determined time without control actions, this routine is exited and the device will be turned off to save power. The duration of this timer may be several hours. If the time has not expired, control is transferred to step S28.

In step S28, the ACCUM_FULL flag state is checked. This flag is set in step S10 (FIG. 4) when the required number of pressure samples have been added to the accumulator. If the flag is set, control is transferred to step S29; if not, control is transferred to step S33.

In step S29, the accumulated value is divided by the number of samples to provide an average value of the accumulated samples. Control is then transferred to step S30.

In step S30, the value DP is calculated as the magnitude of the difference between the new accumulated average and the reference value. The direction of the deviation may also be noted for various purposes such as chime selection. Control is then transferred to step S31.

In step S31, the current VAR_TRIG value is compared to the new DP value. If VAR_TRIG is less than DP, VAR_TRIG is set to the new DP value. This way, VAR_TRIG will immediately track the highest values of DP. If no new higher values occur, VAR_TRIG will slowly decay to zero due to step S12 of FIG. 4. Control is then transferred to step S32.

In step S32, the sample accumulator is reset to zero and the ACCUM_FULL flag is cleared to prepare for a new accumulation of samples. Control then transfers to step S33.

In step S33, the CHIME_DELAY timer is check for expiration. This timer is started at the beginning of each chime to provide a minimum time between chimes. When the timer expires, a new chime is allowed and control is transferred to step S34. If the timer has not expired, control loops back to step S25 for continuous operation.

In step S34, the value of VAR_TRIG is used in an algorithm to determine if a new chime should start. If so, the new PHASE_INC values, CHIME_DELAY and initial ATTEN_INDEX for the new chime are determined. After this step, control loops back to step S25 for continuous operation.

When the algorithm starts a chime, it selects from a table of predetermined pairs of PHASE_INC values. Each pair defines a chime sound. The selection has a random component and can be modified according to parameters such as estimated wind direction. The algorithm also sets a minimum duration, CHIME_DELAY, to wait before allowing the next new chime to start. The duration has a random component, and can be modified according to parameters such as estimated wind intensity, indicated by VAR_TRIG. The algorithm also sets the initial ATTEN_INDEX value. This value normally starts at zero, but it can be increased to start the chime at a lower attenuation envelope value. Generally, higher values of VAR_TRIG will cause the creation of louder and more frequent chimes. If the VAR_TRIG value is below a predetermined threshold, no new chime is generated but any chimes in progress are allowed to complete.

The maximum number of simultaneous chimes is limited by the resources and performance of the processor. The samples for all chimes must be calculated within one sample period. Each waveform is generated independently and they are mixed together to form the final output. When a new chime starts, the selected PHASE_INC, CHIME_DELAY and ATTEN_INDEX values are assigned to one set of chime resources. A resource is freed when the chime completes or it can be reassigned with new parameters before the chime completes.

Obviously, many modifications and variations of the present invention are possible in light of the above teaching. It is therefore to be understood that the invention may be practiced otherwise than specifically described.

I claim:

1. A device for generating sounds based on air movement, said device comprising:
   (a) an enclosure providing an external surface for airflow;
   (b) at least one differential pressure transducer having ports pneumatically coupled with the air outside of said enclosure;
   (c) processing means coupled to each differential pressure transducer and operable to measure the pressure difference between said ports; and
   (d) sound generating means operable to create sounds with parameters based on changes to said pressure difference.

2. A device according to claim 1 wherein said enclosure has an outer surface contoured to provide asymmetrical airflow paths across the external surface of said enclosure.

3. A device according to claim 1 wherein said differential pressure transducer is a solid-state piezoresistive sensing element with a plurality of ports.

4. A device according to claim 1 wherein said processing means stores a plurality of pressure differential measurement values from said differential pressure transducer.

5. A device according to claim 1 wherein said processing means includes calculating a reference value based on said pressure differential measurements.

6. A device according to claim 5 wherein said processing means generates and records a directional value based on the change at a sample interval of said pressure differential with respect to said reference value.

7. A device according to claim 5 wherein said processing means calculates a magnitude value based on the change at a sample interval of said pressure differential with respect to said reference value.

8. A device according to claim 7 wherein said processing means generates a variable trigger signal dependent upon each sample of said magnitude value.

9. A device according to claim 8 wherein the value of said variable trigger signal is used to determine parameters for said sound generating means.

10. A method of generating sounds based on air movement around a device, said method comprising:
    (a) providing a plurality of airflow paths across the surface of said device;
    (b) detecting differences in the air pressure of said airflow paths;
    (c) generating a pressure differential signal based upon differences in the air pressure of said airflow paths;
    (d) generating a variable trigger signal representing the relative magnitude of said air pressure differential signal;
    (e) processing said variable trigger signal; and
    (f) generating a plurality of sounds having parameters dependent on said processing of variable trigger signal.

11. A method according to claim 10 wherein said sound parameters are dependent on a random component.

12. A method according to claim 10 wherein sounds have a pitch dependent on said variable trigger signal.

13. A method according to claim 10 wherein said sounds have a volume dependent on said variable trigger signal.

14. A method according to claim 10 wherein said sounds are generated at intervals dependent on said variable trigger signal.

15. A method according to claim 10 wherein said sounds have a duration dependent on said variable trigger signal.

16. A method according to claim 10 wherein said sounds are of a type selected by a user-operable control.

17. A method according to claim 10 wherein said processing of said variable trigger signal is adjusted by one or more user-operable controls.

18. A method according to claim 10 wherein said sound generating is based upon sample values from one or more sine wave tables, and said sample values are combined together to result in an analog signal in the audio frequency range.

19. A method according to claim 18 wherein said sample values are combined by using a signed summation.

20. A method according to claim 18 wherein said sample values are combined by multiplying one sample value by another sample value.

21. A method according to claim 18 wherein said sample values are combined by modulating the frequency of one sample value by another sample value.

22. A method according to claim 18 wherein said sample values are combined by modulating the amplitude of one sample value by another sample value.

23. A method according to claim 18 wherein the combining of said sample values includes modifying the amplitude of said analog signal over time.

* * * * *